United States Patent [19]

Ferrier et al.

[11] Patent Number: 5,260,869
[45] Date of Patent: Nov. 9, 1993

[54] COMMUNICATION AND FEEDBACK SYSTEM FOR PROMOTING DEVELOPMENT OF PHYSICALLY DISADVANTAGED PERSONS

[75] Inventors: Linda J. Ferrier, Lexington; Harriet J. Fell, Newtonville, both of Mass.

[73] Assignee: Northeastern University, Boston, Mass.

[21] Appl. No.: 748,269

[22] Filed: Aug. 21, 1991

[51] Int. Cl.⁵ .............................................. G06F 15/00
[52] U.S. Cl. .............................. 364/413.01; 434/112; 340/407
[58] Field of Search ............... 364/413.01; 340/407; 358/105; 434/112, 255

[56] References Cited

U.S. PATENT DOCUMENTS

| | | | |
|---|---|---|---|
| 3,781,802 | 12/1973 | Kafafian | 434/112 |
| 3,818,448 | 6/1974 | Wilkins | 434/112 |
| 3,818,487 | 6/1974 | Brody et al. | 340/407 |
| 3,987,438 | 10/1976 | Lindenmüeller et al. | 340/407 |
| 4,334,280 | 6/1982 | McDonald | 364/710 |
| 4,408,192 | 10/1983 | Ward et al. | 340/407 |
| 4,414,537 | 11/1983 | Grimes | 434/112 |
| 4,465,465 | 8/1984 | Nelson | 343/112 |
| 4,543,957 | 10/1985 | Friedman et al. | 128/630 |
| 4,785,420 | 11/1988 | Little | 364/513.5 |
| 4,908,845 | 3/1990 | Little | 379/51 |
| 4,926,866 | 5/1990 | Lee | 128/630 |
| 4,926,879 | 5/1990 | Sevrain et al. | 128/798 |
| 4,969,096 | 11/1990 | Rosen et al. | 364/413.02 |
| 5,169,342 | 12/1992 | Steele et al. | 434/112 |

FOREIGN PATENT DOCUMENTS 355258A  2/1990  European Pat. Off.

OTHER PUBLICATIONS

Conference: Eurocon '77 Proceedings on Communications, Cossalter et al., "A Microcomputer-Based Communication System for the Non-Verbal Severely Handicapped".

Primary Examiner—Roy N. Envall, Jr.
Assistant Examiner—Laura Brutman
Attorney, Agent, or Firm—Weingarten, Schurgin, Gagnebin & Hayes

[57] ABSTRACT

A system for helping infants or physically impaired individuals to communicate with others, such as parents or caregivers, to learn cause and effect relationships, to control a surrounding environment, and to promote normal development by facilitating the individual's exploration of a developmental sequence of sounds and a repertoire of simple spoken words. The system includes an input device with a plurality of actuator elements that are selectively responsive to gross physical movement of the individual, an audiovisual output device for providing feedback to the individual and emitting communicated messages to others, and an adaptive control unit for transforming information provided by the input device into instructions for use by the audiovisual output device.

12 Claims, 5 Drawing Sheets

5,260,869

COMMUNICATION AND FEEDBACK SYSTEM FOR PROMOTING DEVELOPMENT OF PHYSICALLY DISADVANTAGED PERSONS

FIELD OF THE INVENTION

This invention relates to interactive computer systems, and particularly to interactive computer systems for use with infants or disabled individuals.

BACKGROUND OF THE INVENTION

Severely disabled infants, such as infants with cerebral palsy (CP), frequently grow up to become passive children with limited or nonexistent speech, even when the infant possesses apparently normal cognitive skills. The following factors have been proposed to explain this passivity: limited oral motor control and a consequent diminished repertoire of speech sounds; limited ability to control its physical environment by manual manipulation of objects; and consequent limited opportunity to engage caregivers in mutually enjoyable interaction.

The incidence of infants with CP is estimated to be a least one per thousand live births. Some CP infants are likely to suffer from diminished control of the vocal tract and the respiratory system upon which speech depends. These physically impaired infants are commonly described by their parents as "quiet babies". Without a means by which a CP infant can vocalize, the cognitive and emotional development of the infant is at risk.

Babbling in infancy has been studied, and it has been found that an infant progresses through an identifiable sequence of developmental stages characterized by babbles of increasing syllabic structure and segmental contrastivity. The infant's progression through these babbling stages is assumed to be partly dependent on maturational changes in the configuration of the infant's vocal tract, and partly upon changes in motor control. Babbling has not been found to be closely related to cognitive level. Of particular interest is the finding that deaf infants use manual babbles, i.e., repetitive movements similar to the canonical babbles used by infants learning speech. This finding indicates that there is an innate capacity to practice the motor movements for babbling, regardless of whether the infant is learning to interact via speech, manual signing, or other form of non-vocal communication, such as device-assisted communication. Thus, babbling appears to be a form of exploration and rehearsal of the particular communication mode that the infant is learning which is necessary for later phonological development. Furthermore, feedback has been found to be important to an infant's progression through the various stages of babbling. For example, an infant is reinforced by the sound of his or her own voice.

The social reinforcement that the infant receives in the second half of its first year appears critical to the development of a vocalic repertoire, and to an understanding of the "rules of conversation" that must be developed to achieve meaningful communication with parents or other caregivers. By vocalizing and using manual gestures and changes of facial expression, infants can elicit responses from caregivers. By responding to such communicative initiatives, parents or other caregivers reinforce these activities. Physically disabled infants are unable to control the motor systems upon which speech is dependent, or the manual systems for playing with objects or making gestures. Due to motor impairment, they may also show little facial affect. Consequently, they lack the means for providing consistent signals to their parents or other caregivers that are available to normal infants. As a result, caregivers are unable to discern patterns of behavior to which they can attach meaning and respond accordingly. Ultimately, physically disabled infants are likely to grow up passive and with a diminished motivation to learn.

By exploring their environment, normal infants gradually develop the concept that an action brings about a consequence. The infant's early attempts at vocalization may be seen as an exploration of cause and effect using the vocal mechanism. Actions such as banging and shaking are developed and reinforced by interesting consequences. Also, toys such as rattles and noise-makers are designed to help the child in his or her explorations of cause and effect relationships. However, physically disabled infants are frequently limited in their ability to explore the environment and to vocalize, resulting in delayed or attenuated development.

SUMMARY OF THE INVENTION

A system is disclosed for use by an infant or a physically disabled individual that includes an input device with a plurality of actuator elements that are selectively responsive to gross physical movement of the individual; an audiovisual output device for providing feedback to the individual and for communicating messages to others near the system; and an adaptive control unit. The adaptive control unit transforms information provided by the input device into instructions to the audiovisual output device in accordance with a spatiotemporal pattern of activation of the actuator elements of the input device. In a preferred embodiment, the adaptive control unit also includes a test and measurement module for collecting statistical information based on patterns of activation of the input device. For example, by allowing an infant to use very early developing motor activity to activate various sound recordings, information can be obtained regarding the earliest age at which infants can be taught to understand cause and effect. The system of the invention is particularly suited to be operated by the earliest movements an infant can make, e.g., rolling, kicking, hitting, and other gross motor activities. Additionally, the input device can be fitted inside a crib or against a vertical surface that the infant can kick against.

The system can be used to help infants or physically impaired individuals communicate with others, such as parents or caregivers. It can also be used to learn cause and effect relationships, serving as both an educational aid and an amusement device. Additionally, it can promote normal development by facilitating the individual's exploration of a developmental sequence of babbling sounds, as well as providing a repertoire of simple spoken words, and thus also serves as a therapeutic aid by promoting normal physical, emotional, and cognitive development. In a preferred embodiment that includes a testing module, the system is useful as a research or diagnostic tool. In a further preferred embodiment, the system allows the individual to control various aspects of its environment. The system can also be used with normal infants to assist in their development or to test and measure developmental performance.

DESCRIPTION OF THE DRAWING

The invention will be more fully understood from the following detailed description, in conjunction with the accompanying figures, in which.

DETAILED DESCRIPTION OF THE INVENTION

Figure 1:
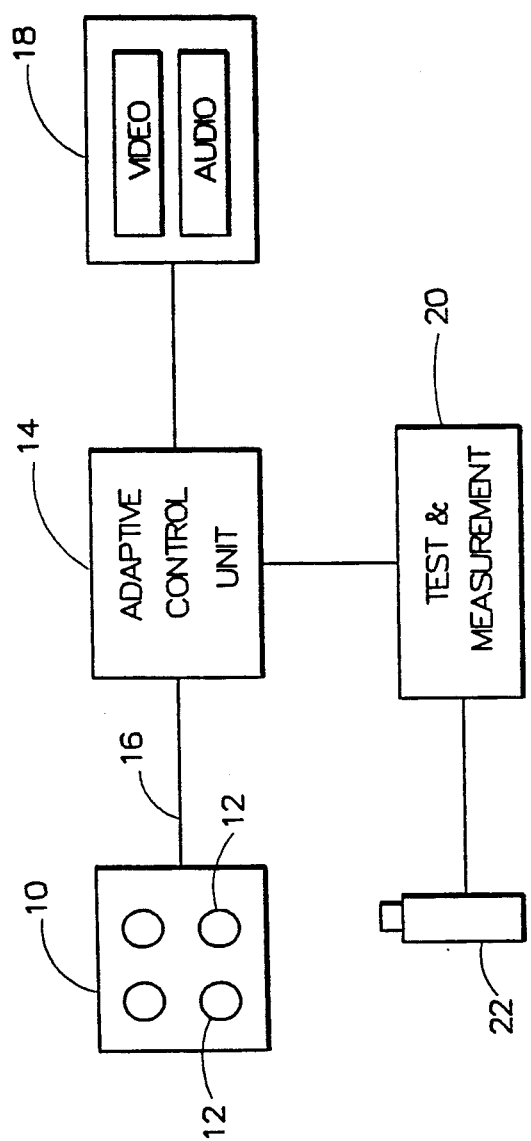
FIG. 1 is a schematic diagram of an embodiment of the system of the invention.

With reference to FIG. 1, the system of the invention includes an input device 10, including a plurality of actuator elements 12, such as microswitches, that are each selectively responsive to gross physical movement of an individual, such as an infant or CP patient. Each actuator element 12 is connected to an adaptive control unit 14 via a data interface line 16. The adaptive control unit 14 serves to transform information provided by the input device 10 into instructions to at least one audiovisual output device 18, such as a personal computer with digital sound playback unit and a graphic display, by relating activation of individual actuator elements 12 to corresponding outputs, such as a sequence of canonical baby babbles or words, as will be explained in further detail below. Each audiovisual output device 18 serves to provide feedback to the individual that activates the system of the invention using the input device 10, as well as serving to communicate messages from the individual to others.

The input device 10 in exemplary implementation is a NINTENDO POWERPAD which is a pad, 38.5" by 36.75" in size, placeable on a floor, and with twelve 9" by 9" actuation zones coupled to the switches included therein. Other possible input devices include a more sensitive blanket with an alternate switch distribution; a joystick; a rollerball; a computer mouse; a data-glove, such as one used with a so-called virtual reality apparatus; or any other device for sensing body movement and providing a signal indicative of such movement. Alternative output devices include any other sound synthesis or playback device, as well as any video synthesis or playback device, such as a VCR or a videodisc player.

When calibrating the system, or when using the system as a research or diagnostic tool, a test and measurement unit 20, which can be a module within the adaptive control unit 14, can be used for collecting and storing statistical information based on patterns of activation of the actuator elements of the input device 10. Also, an audiovisual recording unit, e.g., a video camera/recorder 22, can be controlled by the test and measurement unit 20 to record events associated with actuation of any of the actuator elements 12.

Figure 2:
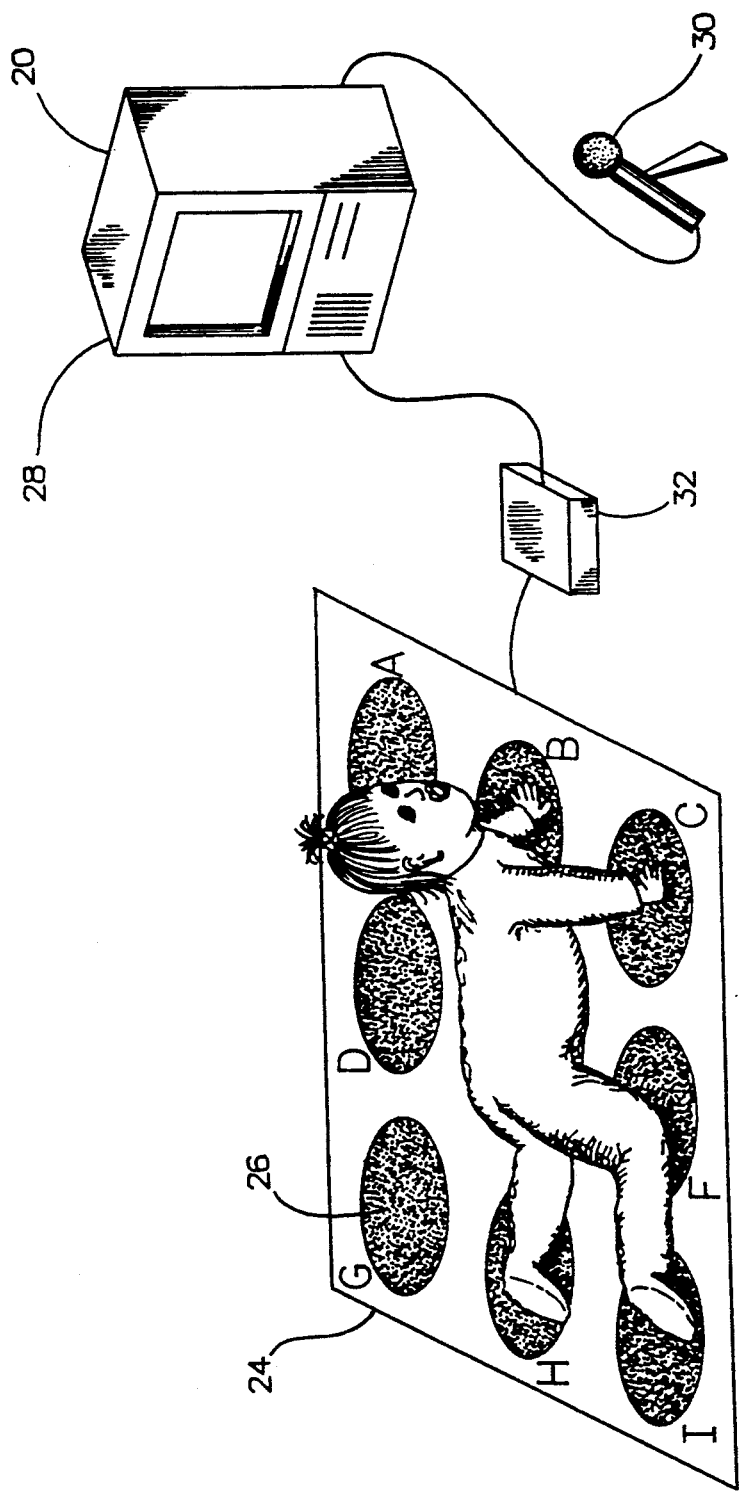
FIG. 2 is a sketch of the invention in use by an infant.

With reference to FIG. 2, in an exemplary embodiment of the system of the invention, referred to as a "baby babble blanket", the system includes a "blanket" 24, such as a NINTENDO POWER PAD, which serves as an input device. The blanket includes twelve large-area microswitch zones 26 that are sensitive to a range of pressures commonly applied by individuals ranging from infants to adults. For example, a nine month old infant weighing twenty pounds can activate any one of the microswitch zones 26.

The system also includes a personal computer 28, such as a MACINTOSH computer, which executes a commercially available software program called SOUND EDIT that works in conjunction with a MACRECORDER, both available from Farallon Computing, Berkeley, Calif. SOUND EDIT enables a user to digitize, record, and edit sounds, such as speech or music. MACRECORDER includes a microphone, or can be used in conjunction with a separate microphone 30 to digitally record babble sounds and simple words and phrases, and then store them on a nonvolatile storage medium, such as a magnetic disk, that is accessable to the computer for retrieval at a later time. More generally, any sound can be recorded and played back using MACRECORDER or similar apparatus.

The computer also serves as an adaptive control unit. Switch closure signals are received from the blanket via an interface 32, such as a GOLD BRICK, manufactured by Transfinite Systems Company, Inc., Cambridge Mass., and then a control program executed by the computer interprets a pattern or sequence of microswitch actuations and executes a prescribed output sequence. For example, the computer will play different digitized babbles, depending on which switch is activated. The babbles are based on audio recordings of vocalizations of a normally developing infant. The developmental sophistication of the babbles can be increased over time to allow an expansion of the infant's repertoire in a time to developmentally normal fashion. The infant can also activate switches sequentially to produce repetitive babbled strings, or canonical babbles, and eventually words and sentences.

The personal computer executes a control program, such as computer software written using HYPER-CARD and THINK PASCAL, for example, that coordinates all input, output, and data collection activity. In particular, the software controls how each switch actuation results in communication with a caregiver or control of the infant's environment. The software must take into account the infant's position on the "blanket" input device 24. Only switch actuations that result from volitional activity are of interest, so the caregiver interprets any continuous switch actuation that persists for more than a particular period of time, e.g., one minute, as being the result of the baby resting his or her body on a microswitch 26 of the blanket 24, as opposed to a intentional communicative or manipulative act. Therefore, signals that originate from a microswitch 26 that is pressed for more than a specified time will be ignored.

Also, the caregiver monitors the frequency with which certain microswitches are actuated, and assigns the microswitches according to the observed frequency of actuation of each microswitch. For example, if an infant is placed on the blanket 24 in a position such that it rests primarily on the regions of the blanket 24 corresponding to microswitches 26E and 26H, the microswitches 26E and 26H remain actuated beyond a preset limit, and are therefore be disabled. In this position, the infant will tend to actuate the microswitches 26D and 26F more often than he or she will actuate the microswitch 26A, for example. The caregiver can also change the output associated with a microswitch if the frequency with which it is pressed changes. Furthermore, if the overall pattern of activation changes significantly, all previously disabled microswitches can be re-enabled. The caregiver then continues to monitor all of the microswitches 12 so that upon any prolonged actuation of a microswitch 12, the caregiver would disable that switch, as before.

It is important that involuntary movements not result in audiovisual feedback. In one embodiment, a caregiver or experimental supervisor disables any microswitches that are actuated due to involuntary movements.

The outputs associated with the microswitches 12 can be selected to promote a particular outcome, such as behavior modification, therapeutic action, amusement, communication, or control of the infant's immediate environment. For example, if it is desired that the infant kick its legs, more pleasing sounds or light displays, for example, can be associated with microswitches disposed near the infant's legs, so as to reinforce that behavior. Alternatively, uninteresting consequences can follow from the infant pressing any switch associated with undesirable movements. To promote speech development and facilitate communication with a caregiver, as discussed above, actuation of various microswitches 12 can result in well defined and consistent consequences, such as playback of digitally recorded babbles, or simple words and phrases, in accordance with the infant's developmental stage. Additionally, certain microswitches can be associated with pleasing sound effects, music, the mother's voice, or a pleasing colorful video or light display. This feature provides amusement, as well as an enjoyable way to experience cause and effect relationships, and also builds the infant's sense of self-efficacy. Further, a particular microswitch can be associated with one or more environmental controls, such as room temperature or lighting; the infant could also control the location of various items in the room, such as the placement of a mobile. Of course, the function of each microswitch can also be assigned by a human supervisor based on observation of the infant's activity.

Examples of the various patterns and sequences of microswitch activation include any two microswitches pressed simultaneously, such as 26D and 26F of FIG. 2 which could be so pressed if the infant were lying on its back and moving each arm downward. Three rapid taps of microswitch 26J with the infant's foot could activate a fan directed toward the infant. Alternatively, slow alternating actuations of microswitches 26G and 26I might activate a blue light bulb over the baby, to which a caregiver would respond by bestowing food or attention upon the infant. Those skilled in the art will recognize that there are a prodigious variety of combinations and sequences of inputs, each of which can be associated with one or more of a virtually unlimited set of possible outcomes. Also, the control software that implements the adaptive control technique herein disclosed can be executed in a variety of higher or lower level computing languages, and thus in no way depends upon being implemented using a HYPERCARD or PASCAL program. Furthermore, any and all sounds can be recorded and reproduced using analog as well as digital sound equipment.

In a preferred embodiment of the system of the invention, a test and measurement module 20 records and quantifies the type and number of switch activations over time. It also is cooperative with an audiovisual recording unit, such as a video camera/recorder 22, which records the interactions of the infant or patient with its mother or caregiver. The video camera/recorder 22 is activated whenever a microswitch is actuated, and is turned off after a set interval of time transpires, e.g., five minutes, since the last microswitch activation event. Alternatively, the camera/recorder 22 can be activated by a sonic activation device, incorporated within the camera/recorder 22, for example, which is responsive to sounds produced by the audiovisual output device 18. Thus, an infant's own vocalizations and movements can be recorded, as well as its parent's spoken or non-verbal response. The video camera/recorder 22 is reactivated upon any subsequent microswitch use.

The test and measurement module 20 can be used to evaluate the effectiveness of a particular set audiovisual outputs of the device 18, or the particular way spatiotemporal input patterns of activation of the microswitches are associated with particular audiovisual outputs. First, spatiotemporal input patterns generated by the baby, without generating any associated audiovisual outputs, are recorded by the module 20. Next, the system is configured such that spatiotemporal input patterns cause audiovisual outputs to be generated in response to the input patterns, and the resulting microswitch activation activity is recorded by the module 20. Last, the system is reconfigured so that audiovisual outputs are no longer generated in response to microswitch actuation. In an effective system configuration, associating audiovisual output with spatiotemporal input patterns will increase the frequency with which the microswitches are actuated.

Figure 3:
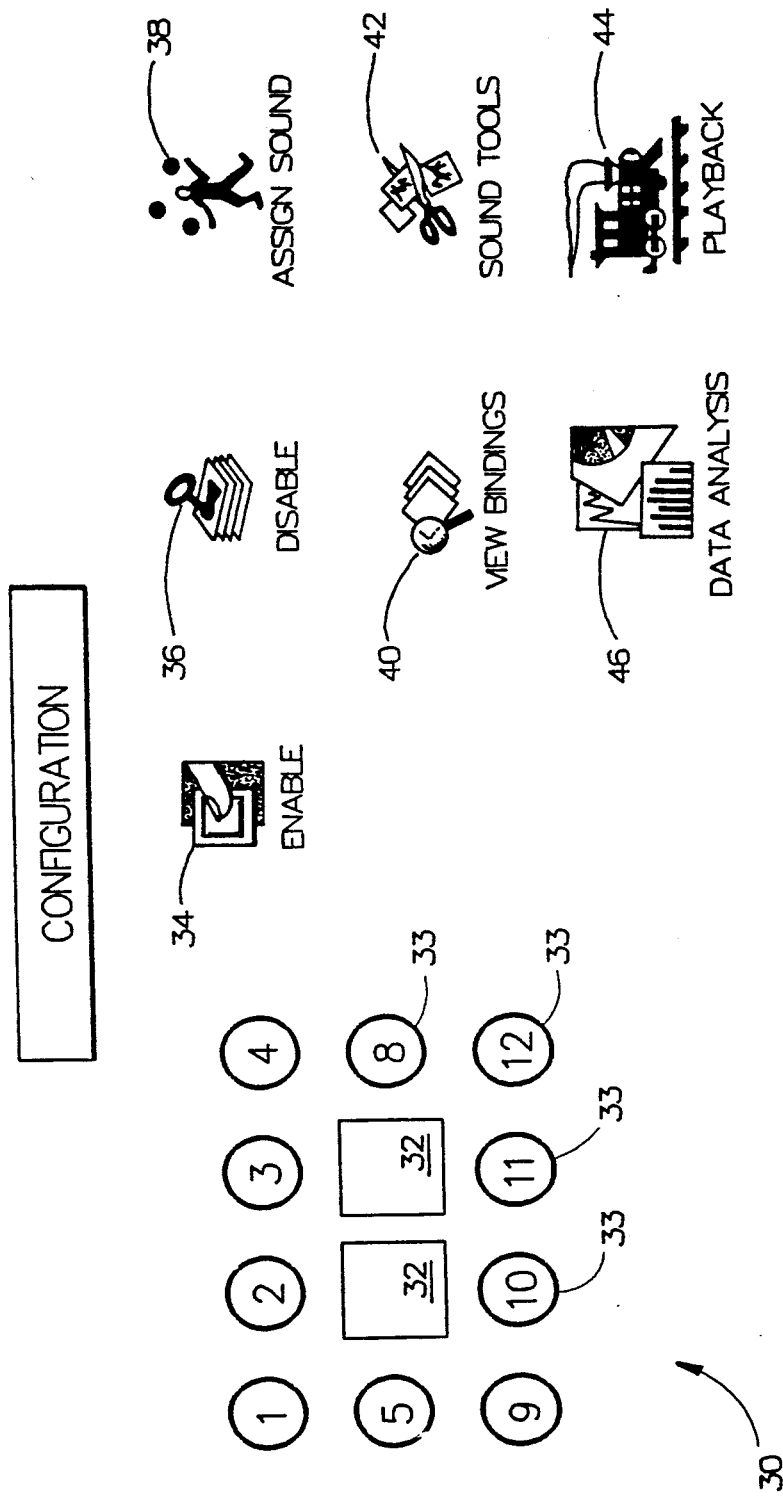
FIGS. 3, 4, and 5 are representations of exemplary computer screen displays.
Figure 4:
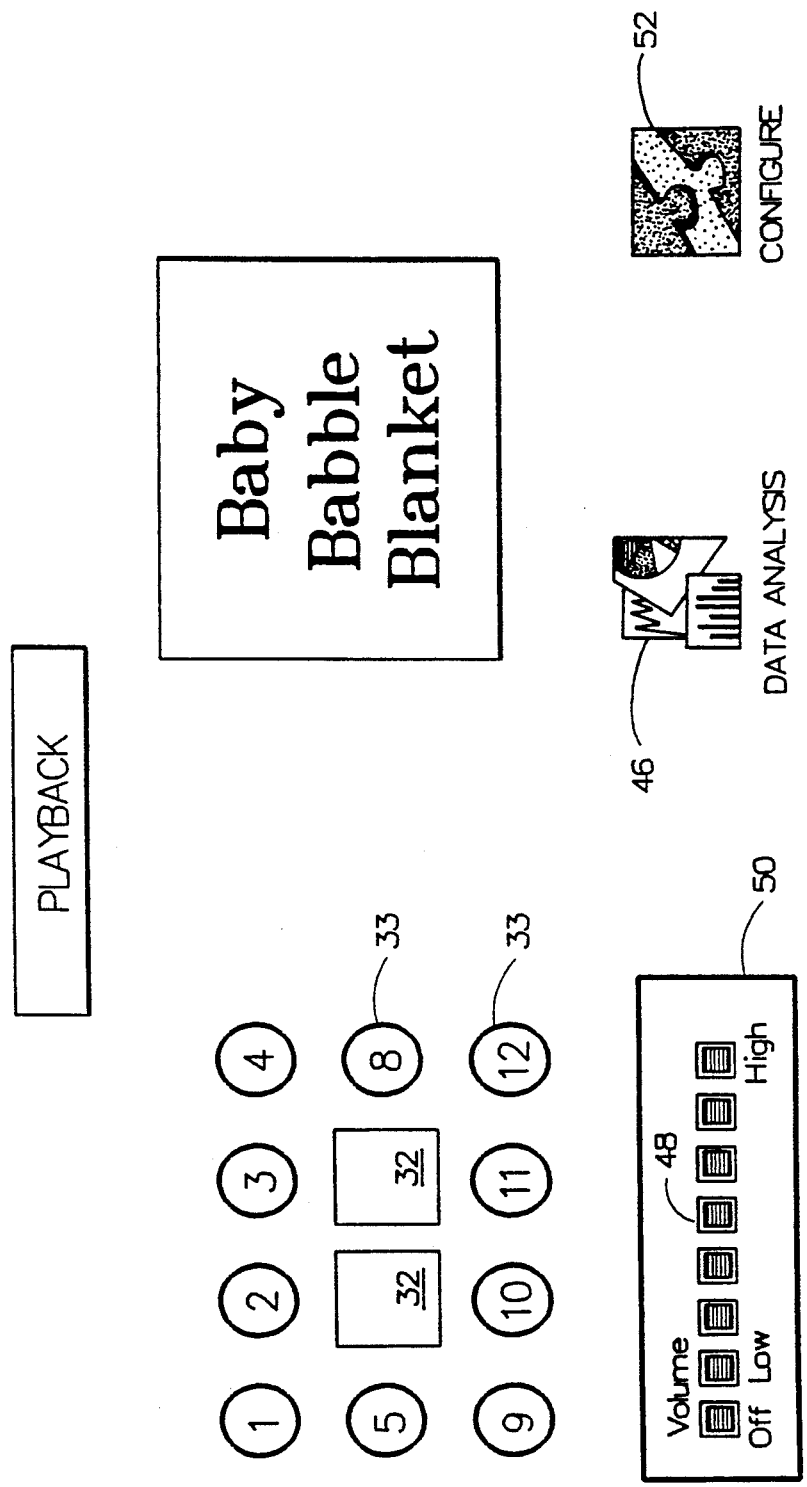
Figure 5:
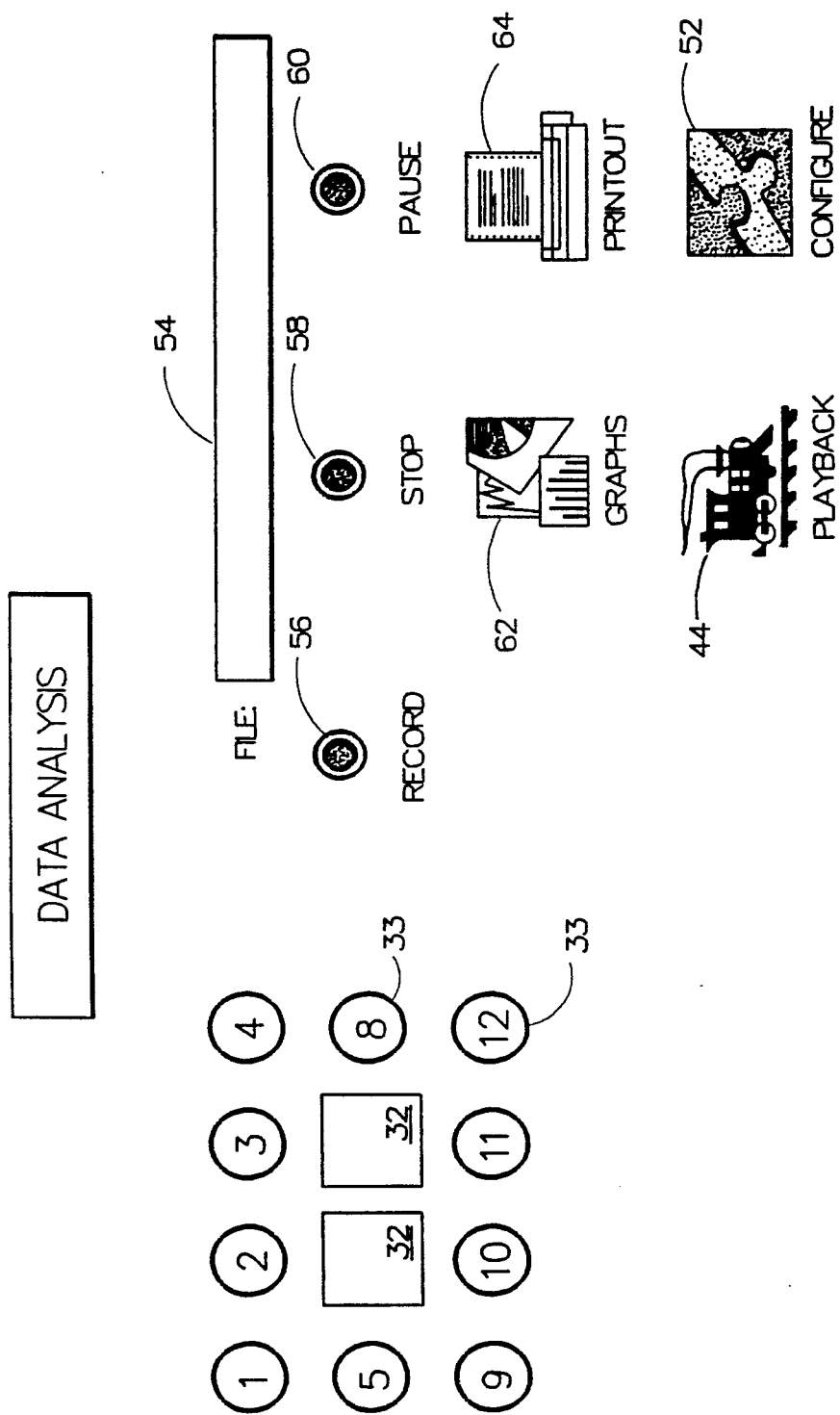

Referring to FIGS. 3, 4, and 5, an exemplary HYPERCARD program is represented by the three screen displays entitled CONFIGURATION, PLAYBACK, AND DATA ANALYSIS. FIG. 3 shows the CONFIGURATION screen which includes a representation 30 of an embodiment of the blanket 24 having twelve microswitches 26. Box icons 32 represent microswitches 26 that have been disabled, as will be further explained below. The remaining microswitches 26 are in an enabled state, and are accordingly displayed as a plurality of icons 33 each consisting of a number within a circle. FIG. 3 shows a configuration of the microswitches 26 having two central switches 32 disabled to provide an infant an area within which to lie.

The CONFIGURATION screen of FIG. 3 includes a further plurality of icons 34-48. A user can select a function associated with an icon by actuating a button on a mouse input device (not shown) when a cursor directed by the mouse is superimposed on the icon, the mouse input device being commonly found as standard equipment with, for example, a MACINTOSH computer.

When the 'Enable' icon 34 is selected, the user is prompted to select a microswitch to enable. Upon actuation of the mouse button, a square icon 32 becomes a numbered circle icon 33, thereby signifying that the microswitch associated with the numbered circular icon 33 has become enabled. Selecting a circular icon 33 after selecting the 'Enable' icon 34 will have no effect.

When the 'Disable' icon 36 is selected, the user is prompted to select a microswitch to disable. Upon actuation of the mouse button, a numbered circle icon 33 becomes a square icon 32, thereby signifying that the microswitch associated with the square icon 32 has become disabled. Selecting a square icon 32 after selecting the 'Disable' icon 36 will have no effect.

Selecting the 'Assign Sound' icon 38 prompts the user to choose a sound from a list of sounds displayed in a standard "pop-up" window (not shown), for example, to be assigned to the selected circular icon 33.

By selecting the 'View Bindings' icon 40, a list of the sound associated with each microswitch is presented in a pop-up window. Also, selecting any circular 33 or square 32 icon will show the name of the sound resource that is associated with that icon.

Selection of the 'Sound Tools' icon 42 provides a list of available sound resources and options, such as 'rename', which renames a sound, 'delete', which deletes a sound, and 'play', which plays a sound to the user.

To move to the PLAYBACK screen of FIG. 4, or to the DATA ANALYSIS screen of FIG. 5, either the 'Playback' icon 44 or the 'Data Analysis' icon 46 is selected, respectively.

Referring to FIG. 4, when the PLAYBACK screen is displayed, selection of any enabled icon 33 causes is associated sound to be played to the user. The user can adjust the volume of the sound by selecting a volume button 48 of the 'Volume' icon 50. To move to the CONFIGURATION screen of FIG. 3, or to the DATA ANALYSIS screen of FIG. 5, either the 'Configure' icon 52 or the 'Data Analysis' icon 46 is selected, respectively.

With reference to FIG. 5, selection of the 'File:' icon 54 shows the user the name of a data file in which data representative of spatiotemporal patterns of activation of the microswitches is to be stored. The 'Record' icon 56 opens a data file, and allows the user to input a file name to replace a default file name. The 'Stop' icon 58 closes the data file opened with the 'Record' icon. The 'Pause' icon 60 suspends storage of data, while leaving the data file open for further storage of data. Selecting the 'Graphs' icon 62 graphically displays the data stored in the data file. 'Printout' serves to print a paper copy of the data stored in the data file. To move to the CONFIGURATION screen of FIG. 3, or to the PLAYBACK screen of FIG. 4, either the 'Playback' icon 44 or the 'Data Analysis' icon 46 is selected, respectively.

Other modifications and implementations will occur to those skilled in the art without departing from the spirit and the scope of the invention as claimed. Accordingly, the above description is not intended to limit the invention except as indicated in the following claims.

What is claimed is:

1. A system for use by an infant, or a physically disabled or developmentally delayed individual comprising:

an input device including a plurality of actuator elements that are selectively responsive to gross physical movement of the individual;

an audiovisual output device for providing feedback to the individual and communicating messages to others proximate to the system; and an adaptive control unit, connected to said input device and to said output device, for transforming information provided by the input device into instructions to the audiovisual output device in accordance with a spatiotemporal pattern of activation of said plurality of actuator elements.

2. The system of claim 1 wherein said adaptive control unit also includes a test and measurement module for collecting statistical information based on said pattern of activation of the input device.

3. The system of claim 2 wherein said test and measurement module includes an audiovisual recording unit for evaluating effectiveness of the system.

4. The system of claim 1 further including means, connected to said adaptive control unit, for allowing the individual to control various aspects of its environment.

5. The system of claim 1 wherein said actuator elements of said input device are pressure activated, large-area switches that are distributed over the surface of said input device.

6. The system of claim 5 wherein said input device is flat and pliable.

7. The system of claim 1 wherein said audiovisual output device is a computer monitor.

8. The system of claim 1 wherein said audiovisual output device emits prerecorded vocalizations corresponding to various stages of normal infant development.

9. The system of claim 1 wherein said audiovisual output device emits simple prerecorded words and phrases.

10. The system of claim 1 wherein said audiovisual output device displays graphic information and emits sounds intended to amuse and educate the individual.

11. The system of claim 1 wherein said adaptive control unit is adapted to allow a caregiver to disable at least one actuator element in accordance with said spatiotemporal pattern of activation of said plurality of actuator elements.

12. The system of claim 11 wherein said adaptive control unit is adapted to allow a caregiver to enable said at least one disabled actuator element and to reassign each one of said plurality of actuator elements in response to a sufficiently new spatiotemporal pattern of activation.

* * * * *

UNITED STATES PATENT AND TRADEMARK OFFICE
CERTIFICATE OF CORRECTION

PATENT NO. : 5,260,869
DATED : November 9, 1993
INVENTOR(S) : Linda J. Ferrier, et al It is certified that error appears in the above-indentified patent and that said Letters Patent is hereby corrected as shown below:

Column 4, line 27, "in a time to developmentally" should read --in a developmentally--.

Signed and Sealed this

Sixteenth Day of August, 1994

*Attest:*

BRUCE LEHMAN

*Attesting Officer*     *Commissioner of Patents and Trademarks*